US008417112B2

(12) United States Patent
Ngo

(10) Patent No.: US 8,417,112 B2
(45) Date of Patent: Apr. 9, 2013

(54) PROTECTION SWITCHING IN WDM RINGS USING A SHARED RING SWITCH

(75) Inventor: Dat D. Ngo, Howell, NJ (US)

(73) Assignee: Alcatel Lucent, Paris (FR)

( * ) Notice: Subject to any disclaimer, the term of this patent is extended or adjusted under 35 U.S.C. 154(b) by 2271 days.

(21) Appl. No.: 10/448,559

(22) Filed: May 30, 2003

(65) Prior Publication Data

US 2004/0243888 A1  Dec. 2, 2004

(51) Int. Cl.
  G02F 1/00 (2006.01)
  G02F 2/00 (2006.01)
  H04B 10/00 (2006.01)

(52) U.S. Cl.
  USPC ................................... 398/5; 398/3

(58) Field of Classification Search .................. 398/4, 5
  See application file for complete search history.

(56) References Cited

U.S. PATENT DOCUMENTS

| | | | | |
|---|---|---|---|---|
| 5,627,837 | A * | 5/1997 | Gillett ........................... | 714/708 |
| 5,724,362 | A * | 3/1998 | Lau ................................ | 714/704 |
| 6,310,911 | B1 * | 10/2001 | Burke et al. ................... | 375/224 |
| 6,405,337 | B1 * | 6/2002 | Grohn et al. ................... | 714/749 |
| 6,591,383 | B1 * | 7/2003 | Michel et al. .................. | 714/704 |
| 6,775,237 | B2 * | 8/2004 | Soltysiak et al. .............. | 370/241 |
| 6,851,062 | B2 * | 2/2005 | Hartmann et al. .............. | 726/22 |
| 6,915,463 | B2 * | 7/2005 | Vieregge et al. .............. | 714/704 |
| 6,917,759 | B2 * | 7/2005 | de Boer et al. ................. | 398/5 |
| 6,968,130 | B1 * | 11/2005 | Pan .................................. | 398/5 |
| 7,113,698 | B1 * | 9/2006 | Ryhorchuk et al. ............ | 398/10 |
| 2001/0040711 | A1 * | 11/2001 | Al-Salameh et al. .......... | 359/128 |
| 2002/0018616 | A1 * | 2/2002 | Li .................................... | 385/24 |

OTHER PUBLICATIONS

"MetroDirector K2™, Next-Generational SDH/SONET Multi-Service Platform," www.ciena.com/products/switching/metrodirectork2/index.asp, printed Jul. 11, 2002.
"DS-3 Interface Card, for MetroDirector K2™ Next-Generation SDH/SONET Multi-Service Platform," www.ciena.com/products/switching/metrodirectork2/ds3card.asp., printed Jul. 11, 2002.
"ONWAVE™ OC-48/stm-16 Add/Drop Multiplexer, ONWAVE Service Blade Family," www.ciena.com/products/transport/shorthual/onwave/oc48adm.asp., Jul. 11 2002.
"Sprint Boosts Fiber-Optic Network Capacity 1,600 percent Ciena Corp. System Installed; Greatly Increases Bandwidth," allegedly dated Jun. 12, 1996, www.ciena.com/news/1996/06/06.12.1996pr.asp, printed Jul. 11, 2002.
"ONLINE 9000™, Metropolitan Transport Solution," www.ciena.com/products/transport/shorthaul/online/online9000.asp, printed Jul. 11, 2002.

* cited by examiner

Primary Examiner — Shi K Li
(74) Attorney, Agent, or Firm — Wall & Tong, LLP

(57) ABSTRACT

A switching method is provided having improved accuracy in monitoring a network to determine when to switch. The method collects and stores a plurality of bit error rate (BER) values. The BER values are analyzed using a BER hysterisis algorithm to check BER degradation. Thereafter, the method switches a transmission port when the degradation exceeds a predetermined BER threshold level for a predetermined period of time. In another embodiment, a feature which transmits a switch polling signal for a predetermined duration is used with the above switching method.

16 Claims, 6 Drawing Sheets

PROTECTION SWITCHING IN WDM RINGS USING A SHARED RING SWITCH

BACKGROUND OF THE INVENTION

1. Field of the Invention

The present invention generally relates to optical fiber network switching and, more particularly, to a switching method having improved accuracy in monitoring a network to determine when to switch.

2. Description of the Related Art

Synchronous optical networking (SONET) and synchronous digital hierarchy (SDH) are standardized optical digital transmission systems that are used, respectively, in North America and internationally. SONET networks typically use synchronous add/drop multiplexers (ADM) to add and/or drop asynchronous DS-n signals onto the links. The ADM devices also re-route signals to avoid faulty communication links. This is referred to as span and ring switching.

Span switching and ring switching are mechanisms to re-route traffic over optical networks. A ring is a network configuration that allows signal path redundancy between nodes on a network by interconnecting the nodes in a loop, or ring. Span switching is performed between two nodes to re-route working traffic over the protection channel along the same path in the event of a failure on the working channel. The failure may be due to a fiber cut of the working channel or signal degradation due to other equipment failure. The working traffic is placed on the protection channel by the transmitting stations, then re-routed to the protection fiber/ring at the receiver, thereby bypassing the failed fiber/equipment. Ring switching is performed between two nodes to re-route working traffic over the protection channel in the opposite direction of the working path. Ring switching is used in the event of a complete fiber cut in the transmission/fiber line. The working traffic from the failed fiber span is thus re-routed to the protection fiber span.

SONET generally specifies that the protection time (the time it takes to re-route client traffic after detection of a failure) must be 50 ms or less; that the number of network elements (Nodes) in the ring is 16 or fewer; and that the total fiber distance around the ring is 1200 km or less. However, factors exist which cause the detection and initiation of the switching time to exceed 50 ms. For example, the size of the network and the length of optical fiber traversed are factors which can cause the time to exceed 50 ms.

Examples of factors that induce switching are a loss of signal (LOS) or bit error rate (BER) that is too high (i.e., a BER threshold is exceeded). However, current systems do not distinguish between a BER that exceeds the threshold due to a true line failure or a BER transient that momentarily causes the BER value to exceed the BER threshold. Transient BERs are generated due to, for example, the addition of one or more channels to a sparsely channel-populated WDM/DWDM system. When the new channel is added, the preexisting channels may undergo some power fluctuation, which could give rise to those channels seeing fluctuating BERs. Another example which causes a transient BER is movement of an optical fiber by a technician.

Local exchange carriers (LECs), and long distance carriers and other telecom service providers require a minimum quality of service (QoS) level. Without knowledge of the actual maximum switching time to an alternate transmission path, it is difficult for an LEC to guarantee the initiation of a switch within 50 ms. Absent an ability to prove adequate uptime rates, a service provider is unable to provide QoS guarantees to its customers.

SUMMARY OF THE INVENTION

These and other deficiencies of the prior art are addressed by the present invention of a method of monitoring an optical network. In one embodiment, a switching method is provided having improved accuracy in monitoring a network to determine when to switch. The method collects and stores a plurality of bit error rate (BER) values. The BER values are analyzed using a BER hysterisis algorithm to check BER degradation. Thereafter, the method switches a transmission port when the degradation exceeds a predetermined BER threshold level for a predetermined period of time. In another embodiment, a feature which transmits a switch polling signal for a predetermined duration is used with the above switching method.

BRIEF DESCRIPTION OF THE DRAWINGS

So that the manner in which the above recited features of the invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE PREFERRED EMBODIMENT

A switching method having improved accuracy in monitoring a network to determine when to switch from one channel to another channel is described. In the following description, numerous specific details are set forth to provide a more thorough understanding of the invention. As will be apparent to those skilled in the art, however, various changes using different selected parameters may be made without departing from the scope of the invention. In other instances, well-known features have not been described in order to avoid obscuring the invention. Thus, the invention is not considered limited to the particular illustrative embodiments shown in the specification and all such alternate embodiments are intended to be included in the scope of this invention.

Figure 1:
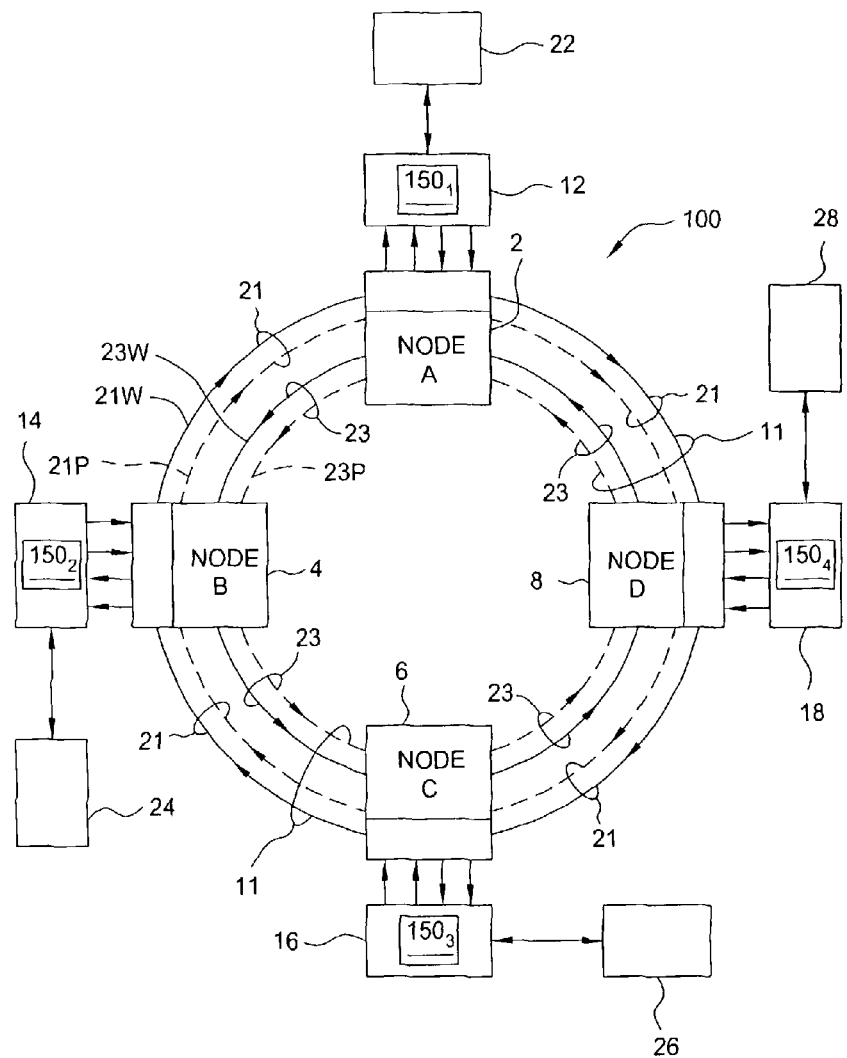
FIG. 1 depicts a high-level block diagram of an embodiment of the invention.

FIG. 1 depicts a high-level block diagram of an embodiment of a 1:N bi-directional ring network 100, in accordance with the invention. Although the invention is described herein with respect to a 1:N network configuration, it is noted that, in other embodiments, the invention can be performed in a 1+1 network configuration. The ring network 100 comprises node A 2, node B 4, node C 6, and node D 8. Each of the nodes 2, 4, 6, and 8 is interconnected in the ring network 100 via a ring transmission line 11. Each of the nodes 2, 4, 6, and 8 is connected, via a respective network switch 12, 14, 16, and 18, to a respective customer premise service optical equipment (e.g., router 22, 24, 26, and 28). Each of the switches 12, 14, 16, and 18 comprises a respective controller $150_1$, $150_2$, $150_3$, and $150_4$ (collectively controllers 150). The controllers 150 are interpreted to perform the described functions of the switches 12, 14, 16, and 18 described herein.

The configuration of the ring transmission line 11 is drawn here in further detail. That is, the ring transmission line 11 contains two optical fibers 21 and 22. These fibers 21 and 22 are arranged in parallel with each other and perform transmission of data in the clockwise direction and counterclockwise direction. Each, further, transmit data divided into working channels (shown by the solid line 21W and the solid line 22W) and line protection channels (shown by the broken line 21P and the broken line 22P). Note that in the figure, for assisting understanding, the optical fibers 21 and 22 are each drawn as two lines, i.e., the solid line and broken line. Each optical fiber comprises a single line through which the working channels and the line protection channels continuously flow.

FIG. 1 illustratively depicts each router connected to the network 100 via a switch. Specifically, router 22 is connected to the network 100 via switch 12, router 24 is connected to network 100 via switch 14, router 26 is connected to the network 100 via switch 16, and router 28 is connected to the network 100 via switch 18. Each switch 12, 14, 16, and 18 monitors the traffic passing between its respective router 22, 24, 26, and 28; and the respective node 2, 4, 6, and 8 to which it is connected. Although, FIG. 1 depicts all of the routers 22, 24, 26, and 28 connected to the network 100 via a respective switch 12, 14, 16, and 18 for illustrative purposes only. It is noted that, in other embodiments, less than all of the routers 22, 24, 26, and 28 are connected to the network 100 via a switch.

Each switch 12, 14, 16, and 18 "knows" the configuration of the network 100. That is, control and management functionality associated with each switch stores and processes data indicative of the presence of the other switches in the network 100, where the other switches are located in the network 100, and which router they respectively monitor. When a switch detects certain conditions, the switch will re-route traffic. For example, if switch 12 detects a transmission failure (e.g., a fiber cut) between nodes 2 and 4, then switch 12 will communicate with switch 14 via nodes 8 and 6.

Examples of transmission failures that cause a switch to initiate a re-routing of traffic include, but are not limited to, a loss of signal (LOS), a loss of frame (LOF), an alarm indication signal (AIS-L), and a loss of synchronization (Loss-Sync). The terms LOS, LOF, AIS-L, and Loss-Sync are understood in the art and for brevity are not further defined herein. In addition, these terms are referred to as "hard events" which induce a switch to seek an alternate transmission pathway.

There are other instances when it becomes beneficial for a switch to find an alternate transmission pathway. For example, a switch (e.g., switch 12) monitors the bit error rate (BER) between its connected router 22 and a desired router (e.g., router 26) connected to the network 100 via switch 16.

The BER is the percentage of bits that have errors relative to the total number of bits received in a transmission, usually expressed as ten to a negative power. For example, in a transmission having a BER of 10-6, one bit out of 1,000,000 bits transmitted is in error.

Often a network administrator (or manufacturer) predetermines an acceptable BER threshold. Typically, when the BER threshold is exceeded, a switch will communicate with another switch within its network to transmit data along an alternate pathway. However, various events occur which cause a momentary increase of the BER ("transient BERs") above the threshold. These transient BERs cause unnecessary re-routing of traffic within the network 100. Transient BERs can be caused by, though not limited to, movement of the optical fiber or the installation of another node within the network 100.

Figure 2:
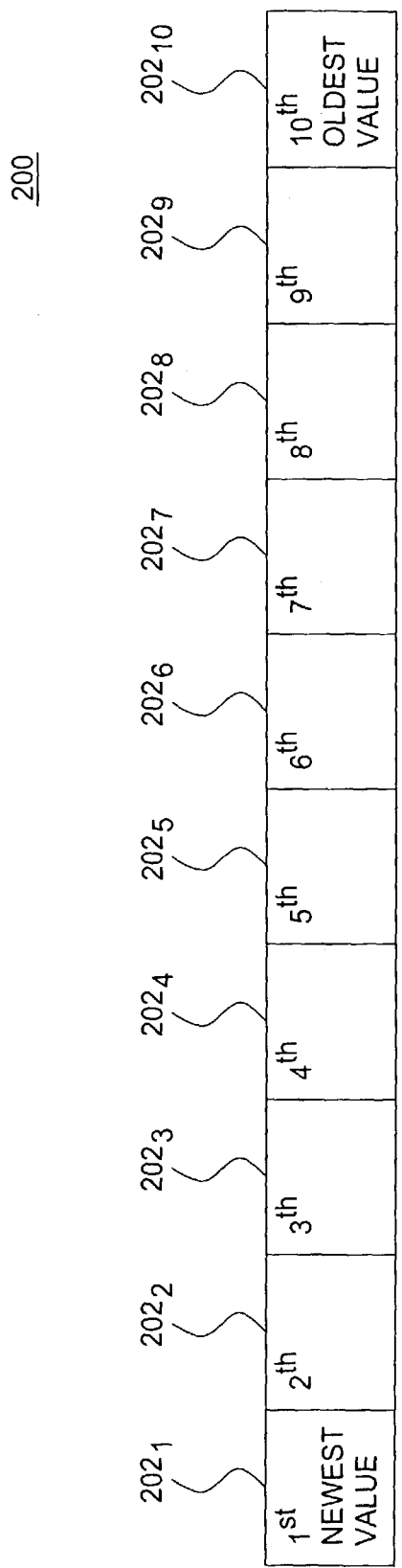
FIG. 2 depicts an embodiment of an array adapted for use with an embodiment of the invention.
Figure 3:
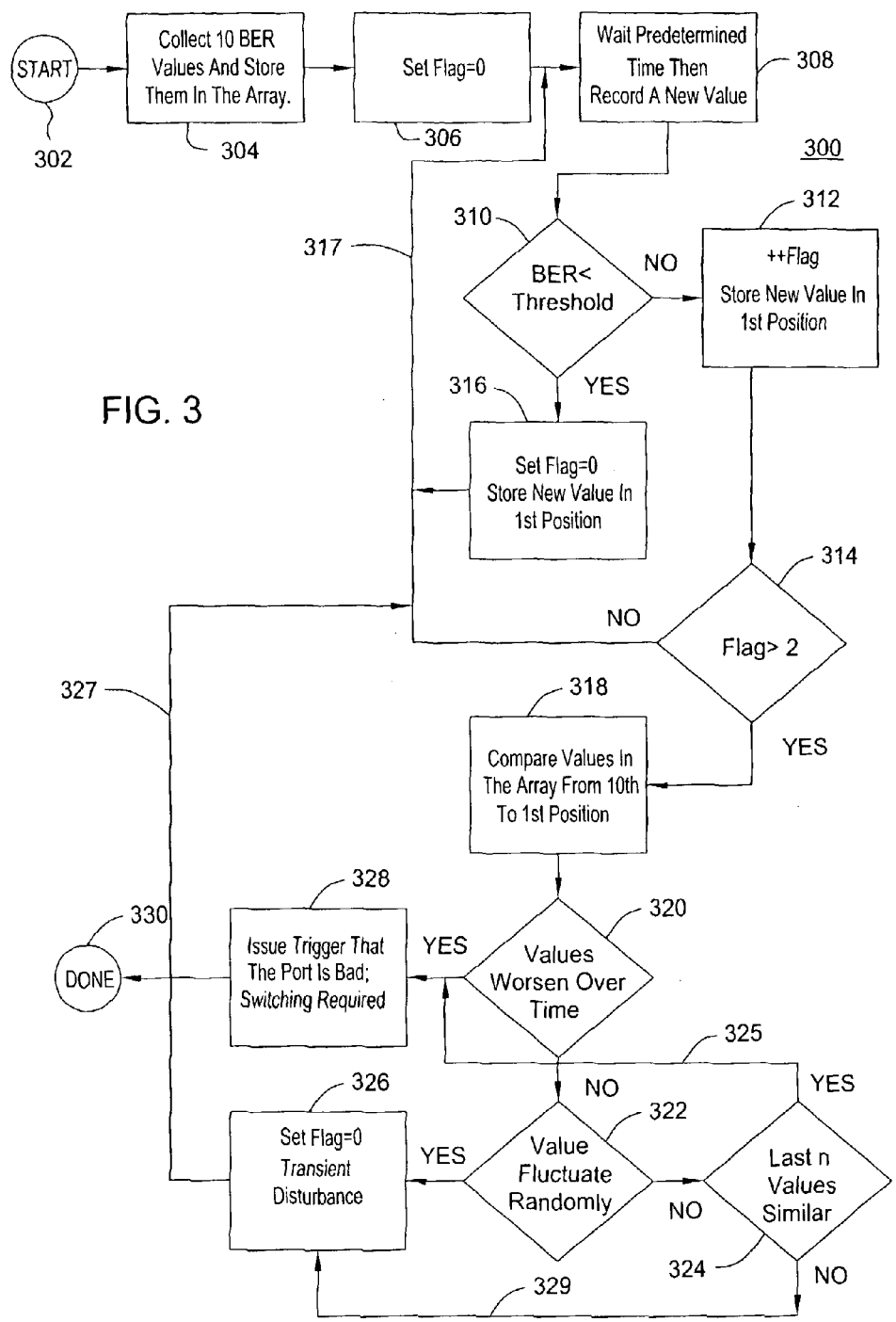
FIG. 3 depicts a flow diagram of a method in accordance with the embodiment depicted in FIG. 2.

One way to prevent transient BERs is to monitor BER values and compare the most current BER values with older BER values. FIG. 2 depicts an embodiment of an array 200 having ten addresses $202_1$-$202_{10}$ (collectively addresses 202). FIG. 3 depicts a flow diagram of a method of utilizing the array, in accordance with the invention, depicted in FIG. 2. For clarity, the reader is encouraged to simultaneously view FIGS. 2 and 3.

Although FIG. 2 depicts array 200 as having ten addresses 202, it is noted that array 200 can have more or less memory locations. Each memory location 202 is adapted to receive a BER value. In array 200, address $202_1$ contains the most recently acquired BER value with each adjacently depicted (in FIG. 2) address containing a previously acquired BER value. For example, address $202_2$ contains the BER value acquired before the BER value stored in address $202_1$, and address $202_3$ contains the BER value acquired before the BER value stored in address $202_2$, etc. Eventually each of the addresses 202 has a BER value therein. Memory location $202_{10}$ represents the oldest BER value acquired and memory location $202_1$ represents the newest BER value acquired. Other BER values acquired between the acquisition time of the oldest BER and the newest BER value are stored in memory locations $202_2$-$202_9$. As newer BER values are acquired, a previously acquired BER value is replaced by a more recently acquired BER value and shifted to another address 202. For example, each of the addresses 202 contains a BER value as explained above. When an eleventh BER value is acquired, the eleventh BER value is stored in address $202_1$; the BER value previously stored in address $202_1$ is shifted to address $202_2$, etc. It is noted that the BER value stored in address $202_9$ is shifted to address $202_{10}$ and the BER value that previously stored in address $202_{10}$ is discarded.

FIG. 3 depicts a flow diagram of a method which utilizes the embodiment of the array 200 depicted in FIG. 2. The method 300 is performed by each of the switches 12, 14, 16, and 18. For clarity, the method 300 will be described with respect to switch 12. The method 300 begins at step 302 and proceeds to step 304.

At step 304, the switch 12 has collected a series of BER values and stored each BER value in an address 202 of array 200. Each BER value is collected at predetermined intervals (e.g., 20 ms. intervals) and stored in a respective address 202 as described above with respect to FIG. 2. For example, the oldest collected BER value is stored in address $202_{10}$ and the most recent BER value collected is stored in address $202_1$.

At step 306, the method 300 sets a flag equal to zero. The flag, described in further detail below, serves as a counter that triggers a series of steps when a predetermined number of consecutive BER values fall below a predetermined BER threshold.

After a predetermined time has lapsed (e.g., 20 ms), the method 300 acquires a new BER value at step 308. The new BER value is stored in address 202, and the previous BER value is shifted to address $202_2$. Each BER value stored in address 202 is relocated to an address 202 within array 200 that stored the previously acquired BER value.

The method 300 proceeds to step 310. At step 310, the method 300 determines whether the newly acquired BER value, i.e., the BER value stored in address 202 is less than a predetermined BER threshold level. It is noted that the BER threshold is any desired BER value.

Upon an affirmative determination that the BER value is less than the BER threshold, the method 300 proceeds to step 316. At step 316, the method 300 sets the flag equal to zero and stores the newly acquired BER value in address location $202_1$. The method 300 then proceeds to step 308. The method 300 proceeds through step 308 as described above.

If at step 310, a negative determination is made, i.e., the BER is greater than the BER threshold, the method proceeds to step 312. At step 312, the flag (previously set equal to zero) is incremented by one and the newly acquired BER value is stored in address $202_1$. As a result of the storage of the newly acquired BER value in address 202, the previously acquired BER values are stored in addresses 202 as already described above.

Step 314 determines whether a predetermined number of consecutive BER values (illustratively three consecutive BER values above the predetermined threshold) are above the predetermined threshold. At step 314, the method 300 determines whether the flag is greater than or equal to 2. If a negative determination is made that the flag is not greater than 2 then the method 300 proceeds to step 308. The iterative loop formed by steps 308, 310, 312, 314, and 316 serves to count consecutive BER values that are above the BER threshold. FIG. 3 illustratively depicts method 300 as determining whether there are three consecutive BER values that are above the BER threshold. However, it is noted that a different number of consecutive BER values that are above the BER threshold can be pre-selected.

Upon an affirmative determination, at step 314, that there are three consecutive BER values above the BER threshold (i.e., that the flag is equal to 3), the method 300 proceeds to step 318. At step 318, the method 300 compares the BER value stored in address $202_3$ with the BER values stored in addresses $202_4$-$202_{10}$; the BER value stored in address $202_2$ with the BER values stored in addresses $202_3$-$202_{10}$; and the BER value stored in address 202, with the BER values stored in addresses $202_2$-$202_{10}$.

At step 320, the method 300 determines whether the BER values worsen over time. Upon an affirmative determination that the BER values worsen over time, the method 300 proceeds to step 328. At step 328, the method 300 issues a signal indicating that the port transmits at an unacceptable BER and that, as a result, switching is required from one channel to another. After step 328, the method 300 ends at step 330.

Upon a negative determination at step 320, the method 300 proceeds to step 322. At step 322, a determination is made whether the BER values fluctuate randomly. If a determination is made that the BER values fluctuate randomly, the method 300 proceeds to step 326. At step 326, the method 300 determines that the randomly fluctuating BER values are a transient disturbance. At step 326, the flag is set equal to zero and the method 300 proceeds to step 308.

If at step 322 a determination is made that the BER values do not fluctuate, the method 300 proceeds to step 324. At step 324, the method 300 determines whether the lastly acquired BER values (e.g., the last three acquired BER values and stored in addresses $202_1$, $202_2$, and $202_3$) are similar. If the last three BER values acquired are similar, the method 300 proceeds to step 328. If a determination is made that the last three acquired BER values are not similar then the method 300 proceeds to step 326. The method 300 performs step 326 as already explained above.

Although the method 300 is described with respect the application of method 300 upon a single channel, it is appreciated that method 300, in other embodiments, operates upon multiple channels. In those embodiments in which method 300 operates upon multiple channels, it is noted that different parameters can be set for each of the respective different channels (e.g., transmission of the polling signal at different intervals for each respective channel).

The SONET standard specifies that the protection time, i.e., the time it takes to re-route client traffic after detection of a failure, must be 50 ms or less when the number of nodes in the ring is 16 or fewer; and the total fiber distance of the ring is 1200 kilometers or less. Another embodiment of the invention provides the maximum switching time necessary in a network, regardless of the size of the optical fiber ring and the number of nodes in the ring, and uses this time to initiate a switch within a minimum amount of time. With knowledge of the maximum switching time in a network, a provider can structure a service level agreement (SLA) accordingly.

In accordance with the invention, an algorithm is provided which calculates the maximum switching time in an optical fiber ring. The algorithm takes into account the number of nodes in a ring; and the total optical fiber distance of the ring. The algorithm utilizes this information to create a collection timer. A switch (e.g., switch 12) sends a polling signal periodically (e.g., every 1 ms) until the expiration of the collection timer. Because of the periodic polling signal, the network will initiate a switch from one channel to another faster than typical switching SONET networks. If network is unable to initiate a switch within the duration of the collection timer then the network knows not to initiate a switch to the protection channel.

Equation 1 is used to determine the maximum time that a periodic polling signal is sent from one node to another.

$$T = (S_{freq} \times N\_nodes) + (D \times M\_km); \quad \text{(Equation 1)}$$

where $S_{freq}$ is the frequency which a switch transmits a polling signal, N_nodes is the number of nodes traversed via an alternate route to a desired node, D is the time required for a packet of light to traverse a single mode fiber, and M_km is the optical fiber length traversed along the alternate route.

For illustrative purposes, presume that the optical fiber between each of the adjacent nodes 2, 4, 6, and 8 has a length of 100 km. The speed of light in optical fiber is about 1.999× $10_8$ m/s. As such, the time that it takes a packet of light to traverse a distance of 100 km is about 0.5 ms. Presume that there is an LOS, i.e., a cut in the optical fiber between nodes 2 and 4. In order for node 2 to communicate with node 4, an alternate path must be established. In FIG. 1, node 2 can communicate with node 4 through nodes 8 and 6.

Equation 1 calculates the maximum time that it takes node 2 to determine whether a pathway to node 4 is acceptable via nodes 8 and 6. For example, utilizing a switch (e.g., switch 12) that transmits a polling signal periodically (e.g., every 1 ms) the collection timer T is calculated as follows:

$$T = (1\text{ms} \times 4(\text{i.e., nodes } 8, 6, 4 \text{ and } 2)) + (0.005\text{ms.} \times 300\text{km}) = 5.5\text{ms}$$

Figure 4:
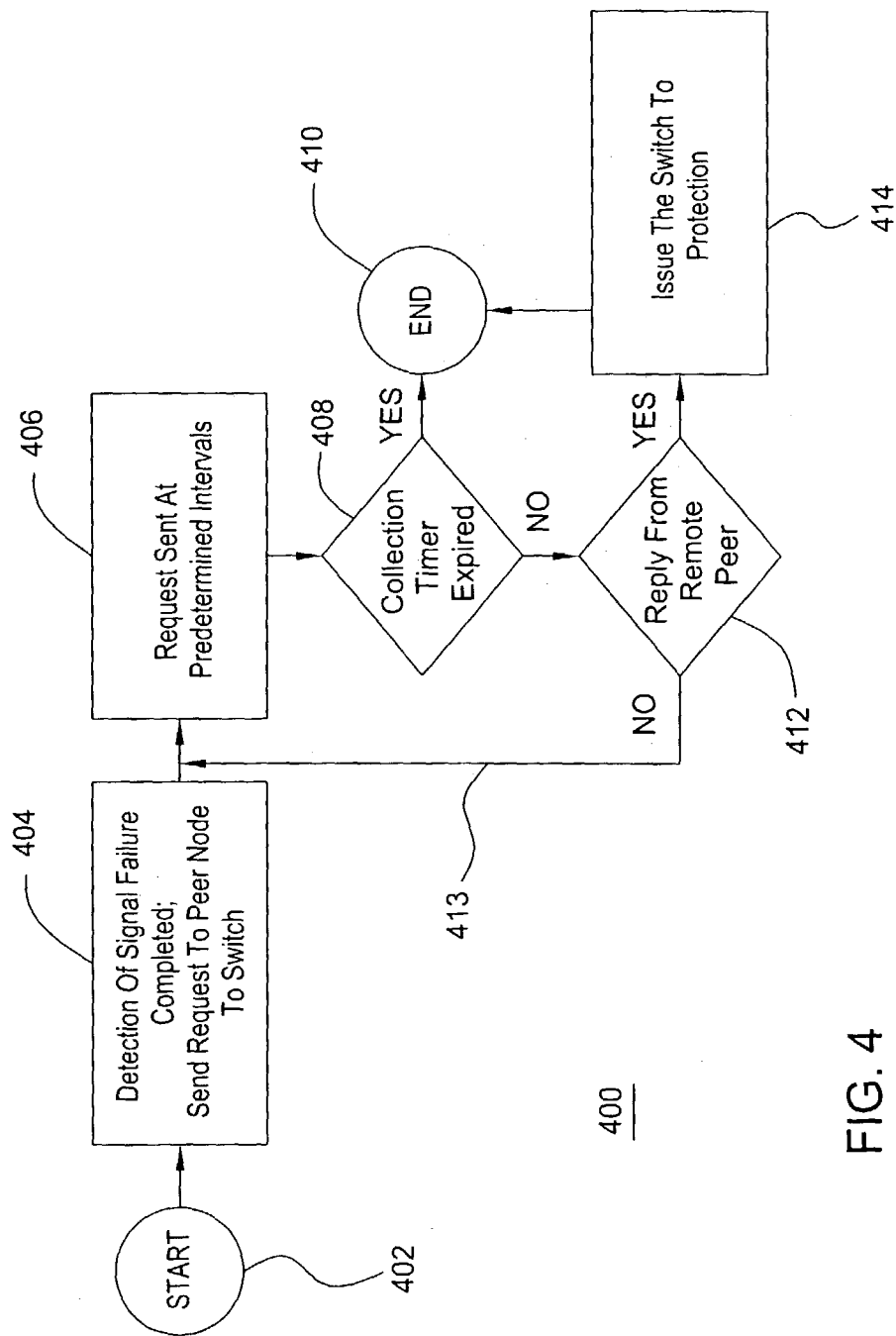
FIG. 4 depicts a flow diagram of a method in accordance with another embodiment of the invention.

FIG. 4 depicts an embodiment of a method which utilizes Equation 1 to minimize the time it takes to initiate a switch from the service channel to the protection channel. If an acknowledgement is sent before the collection timer expires then the communication between the nodes will switch from the service channel to the protection channel. Otherwise the nodes will not switch transmission to the protection channel.

It is noted that Equation 1 and the method described with respect to FIG. 4 can be utilized when there is a signal degradation or an LOS. In addition, Equation 1 and the method described with respect to FIG. 4 can be used in conjunction with the hysterisis method described above with respect to FIG. 3. For clarity, the reader is encouraged to simultaneously view FIGS. 1 and 4.

Using the above calculated 5.5 ms as the duration of the collection timer, the method 400 begins at step 402 and proceeds to step 404. At step 404, switch 12 has determined that there is a signal failure between node 2 and adjacent node 4. Presuming that router 22 needs to communicate with router 24, switch 12 sends a polling signal to switch to the protection channel to switch 14. The request to switch from the service channel to the protection channel is sent by switch 12 every 1 ms towards switch 14.

At step 408, a determination is made whether the collection timer has expired. If the collection timer (5.5 ms) has expired then the method 400 proceeds to step 410 and ends. If a determination is made that the collection timer has not expired then the method 400 proceeds to step 412.

At step 412, a determination is made whether an acknowledgement signal has been received from switch 14. If an acknowledgement signal has not been received from switch 14, the method 400 proceeds, along path 413, towards step 406. Steps 406, 408, and 412 serve as an iterative loop which sends a polling signal every 1 ms until the expiration of the collection timer or until an acknowledgement signal is received from the switch 14.

If, at step 412, an acknowledgement signal has been received from switch 14, the method proceeds to step 414. At step 414, switches 12 and 14 switch to the protection channel. The method 400 proceeds to step 410 and ends.

Typical optical network protection switches do not simultaneously monitor an inbound channel and an outbound channel to determine the cause of a transmission failure in a DWDM system and thereby to switch priority transmissions accordingly. For example, an optical bi-directional line switch ring (O-BLSR) device, produced by a number of major optical vendors, monitors the health of the ring network using an out-of-band (telemetry) channel. If a determination is made that the transmission on the telemetry channel is inadequate or faulty, then the O-BLSR device will switch all priority traffic from the working channel(s) onto the protection channel(s). This O-BLSR device cannot distinguish between a hard event (a fiber cut), and a soft event (an increase in the BER of the working channels). Therefore, upon detection of either a fiber cut or loss of the telemetry channel, the device switches all traffic to the protection channels. This method causes much unnecessary disruptions for normal customer traffic.

In contrast, SONET makes a determination to switch from the working channel to the protection channel based upon the information received within the in-band channel. For example, information contained within the B1, B2, K1, and K2 bytes of the working channel contain data to indicate whether a switch from the working channel to the protection channel is necessary. This switching information is carried in-band, i.e. as overhead bytes of the traffic itself. In the event of a failed working channel (e.g. LOS, high BER), SONET automatically switches priority traffic over to the protection channel. SONET cannot attribute the failure to a failed optical translator or transmission line. It does not distinguish the difference; therefore, protection is assumed to always traverse around the ring, i.e. ring switching. This method does not always offer optimal protection.

Figure 5:
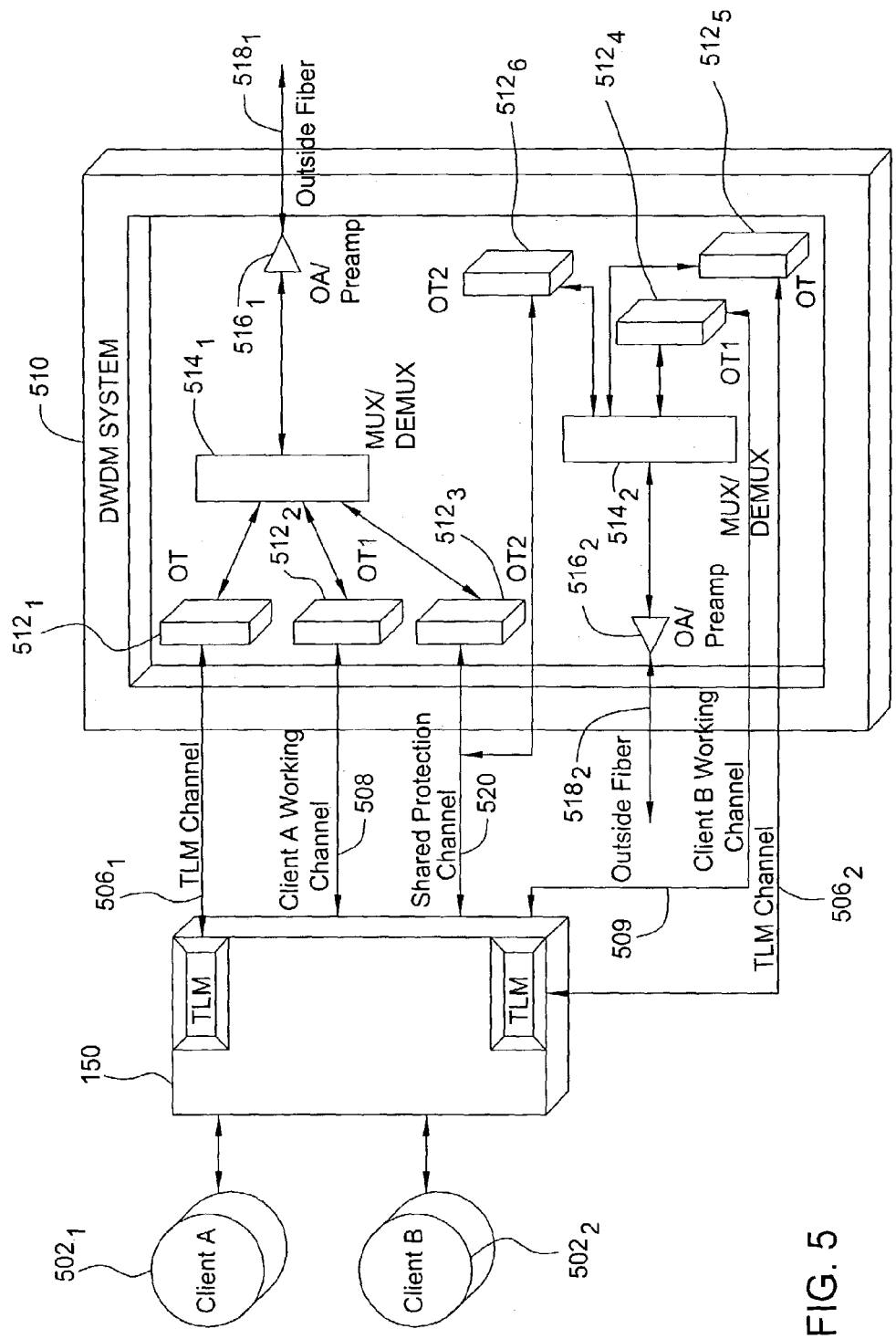
FIG. 5 depicts a high-level block diagram of another embodiment of the invention.

FIG. 5 depicts an embodiment of the invention which utilizes both the in-band signal and an out-of-band signal to trigger a switch in a DWDM system. In addition, the embodiment depicted in FIG. 5 also enables a determination to be made as to which system element, if any, prevents an acceptable transmission rate of priority traffic on an in-band channel. Specifically, FIG. 5 depicts Client A $502_1$, Client B $502_2$, a switch 150, a telemetry channel $506_1$, a telemetry channel $506_2$, Client A working channel (in-band channel) 508, a shared protection channel 520, a Client B working (in-band) channel 509, a DWDM system 510, optical translators $512_1$, $512_2$, $512_3$, $512_4$, $512_5$, and $512_6$ (collectively optical translators 512), a demultiplexer/multiplexer $514_1$, a demultiplexer/multiplexer $514_2$, an optical amplifier/preamplifier $516_1$, an optical amplifier/preamplifier $516_2$, optical fiber 518, and optical fiber $518_2$.

Under normal operating conditions (i.e., priority traffic is communicated along the client A working channel 508 at an acceptable rate), the traffic is communicated using an optical translator $(OT_1)$ $512_2$ via mux/demux 514, and optical amplifier $516_1$ to the optical fiber $518_1$. In addition, under normal operating conditions, Client B traffic is communicated between the Client B $502_2$ and the DWDM system 510 via a Client B working channel 509. It is noted that in a ring configuration priority traffic is communicated from client A 502, towards the DWDM system 510 in one direction (e.g., from left to right) while priority traffic is communicated from Client B $502_2$ towards the DWDM system 510 in the opposite direction (e.g., from right to left).

In the event of an unacceptable transmission on the working channel 508, the switch 504 determines whether there is an acceptable traffic rate on the telemetry channel $506_1$. Upon a determination that there is an acceptable transmission rate on the out-of-band telemetry channel $506_1$, the switch interprets this as an indicator that the transmission fiber is intact. As such, priority traffic for client A is switched to the shared protection channel 520 and to a different optical translator $(OT_2)$ $512_3$ towards mux/demux $514_1$.

The acceptable traffic rate on the out-of-band telemetry channel 506 indicates that a "span switch" to the protection channel was necessary. It further indicates that there may be a problem with the optical translator $512_2$. It is noted that as a result of the span switch, traffic associated with client A 502, proceeds along the protection channel 520 in the same direction (i.e., from left to right) as it would under normal operating conditions (i.e., in the working channel 508).

If the switch determines that there is an unacceptable traffic rate on the working channel 508 and an unacceptable traffic rate on the out-of-band telemetry channel $506_1$, the switch 504 interprets this to indicate that either the mux/demux $514_1$ and/or the optical amplifier 516, has failed (or a fiber cut has occurred). A switch from the working channel to the protection channel due to a fiber cut is referred to as a "ring switch." As a result of the ring switch, priority traffic associated with Client A $502_1$ is switched to the protection channel 520 using optical translator $512_6$, mux/demux $514_2$, and optical amplifier $516_2$. Note that due to a hard switch priority traffic associated with client A proceeds along the ring in the opposite direction (from right to left) towards optical fiber $518_2$.

The switching of priority traffic associated with client B $502_2$ from the working channel 509 to the protection channel 520 is performed similarly to the switching operation described with respect to Client A $502_1$. For brevity, the switching operation of Client B $502_2$ will not be described in as much detail as that described with respect to client A $502_1$. However, it is noted that priority traffic and actual traffic associated with client B $502_2$ is propagated in the ring in the opposite direction of the priority traffic associated with client A $502_1$.

Although FIG. 5 is described with respect to the switch 150 as utilizing a DWDM optical translator, that description is for illustrative purposes only. It is noted that other means for transmitting the telemetry channel can be used in accordance with the invention. For example, in another embodiment of the invention, switch 150 utilizes compatible optics for its telemetry channel. In the embodiment utilizing compatible optics, the telemetry channel is communicated towards a mux/demux without passing through an intermediate optical translator unit.

Figure 6:
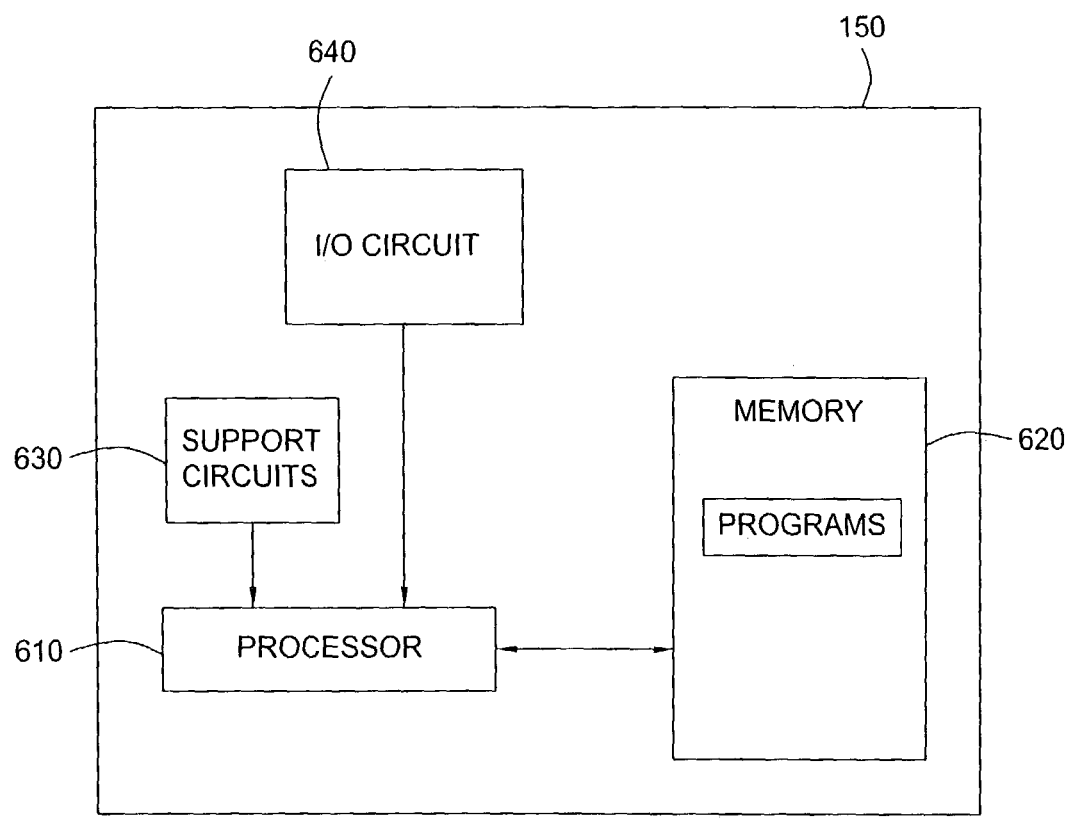
FIG. 6 depicts a high-level block diagram of a controller suitable for use in an inventive switch of FIG. 1.

FIG. 6 depicts a high level block diagram of an embodiment of a controller 150 suitable for use in the switches 12, 14, 16, and 18 of the ring network 100 of FIG. 1. The controller 150 of FIG. 6 comprises a processor 610 as well as a memory 620 for storing control programs and the like. The processor 610 cooperates with conventional support circuitry 630 such as power supplies, clock circuits, cache memory and the like as well as circuits that assist in executing the software routines stored in the memory 620. As such, it is contemplated that some of the process steps discussed herein as software processes may be implemented within hardware, for example, as circuitry that cooperates with the processor 610 to perform various steps. The controller 150 also contains input-output circuitry 640 that forms an interface between the various functional elements communicating with the controller 150. For example, in the embodiment of FIG. 1, the controller 150 communicates with a respective node via a respective thereto first signal path and with a respective router via a respective second signal path.

Although the controller 150 of FIG. 6 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

Although various embodiments that incorporate the teachings of the present invention have been shown and described in detail herein, those skilled in the art can readily devise many other varied embodiments that still incorporate these teachings.

The invention claimed is:

1. A method, comprising:
(a) collecting a plurality of bit error rate (BER) values;
(b) storing said BER values;
(c) analyzing said BER values using a BER hysteresis algorithm to check for an indication of BER degradation, wherein said analyzing comprises:
comparing each of a plurality of recent ones of said collected BER values to a predetermined BER threshold level, wherein said recent ones of said collected BER values include a subset of said collected BER values;
determining, for each of said recent ones of said collected BER values, whether said recent BER value exceeds said predetermined BER threshold level;
in response to a determination that each of said recent ones of said collected BER values exceeds the predetermined BER threshold level, determining whether said collected BER values worsen over time;
in response to a determination that said collected BER values worsen over time, detecting an indication of BER degradation; and
(d) switching a transmission port in response to said indication of BER degradation.

2. The method of claim 1, wherein said BER values are collected at a predetermined interval.

3. The method of claim 1, wherein said collected BER values are stored in an array.

4. The method of claim 1, wherein step (c) comprises:
(c1) setting a flag to zero;
(c2) acquiring a recent BER value;
(c3) determining whether said recent BER value exceeds said predetermined BER threshold level;
(c4) incrementing said flag, storing said recent BER value in an array, and comparing said flag with said BER degradation threshold upon a positive determination in step (c3);
(c5) setting said flag to zero and storing said BER value in said array upon a negative determination is step (c3);
(c6) repeating steps (c2)-(c5) until said flag is greater than a BER degradation threshold;
(c7) determining whether a predetermined number of BER values in said array worsen over time; and
(c8) issuing a trigger signal that switching is required upon a positive determination in step (c7).

5. The method of claim 4, wherein step (c) further comprises:
(c9) determining whether said predetermined number of BER values fluctuate randomly upon a negative determination in step (c7);
(c10) classifying said predetermined number of BER values as a transient disturbance, setting said flag to zero, and proceeding to step (c2) upon a positive determination in step (c9); and
(c11) determining whether said predetermined number of BER values are similar upon a negative determination in step (c9).

6. The method of claim 5, wherein step (c) further comprises:
(c12) classifying said predetermined number of BER values as a transient disturbance, setting said flag to zero, and proceeding to step (c2) upon a negative determination in step (c11); and
(c13) issuing a trigger signal that switching is required upon a positive determination in step (c11).

7. The method of claim 1, wherein said method is adapted for use in monitoring a transmission port associated with a first optical channel in an optical transmission system, said method further comprising:
transmitting an in-band signal via said first optical channel towards a multiplexer;
transmitting an out-of-band signal via a second optical channel towards said multiplexer; and
transmitting said in-band signal via a third optical channel towards said multiplexer in response to an indication of BER degradation of said first optical channel.

8. The method of claim 1, wherein said method is adapted for use in monitoring transmission ports associated with each of a first optical channel and a second optical channel in an optical transmission system, said method further comprising:
transmitting an in-band signal via said first optical channel towards a multiplexer;
transmitting an out-out-band signal via a second optical channel towards said multiplexer; and
transmitting said in-band signal via a third optical channel towards a second multiplexer in response to an indication of BER degradation of said first and second optical channels.

9. A method, comprising:
transmitting an in-band signal via a first optical channel towards a multiplexer;
transmitting an out-of-band signal via a second optical channel towards said multiplexer;
in response to detection of a condition on said first optical channel without detection of a condition on said second optical channel, switching the in-band signal to a third optical channel using a span switch operation; or
in response to detection of a condition on said first optical channel and detection of a condition on said second optical, switching the in-band signal to a third optical channel using a ring switch operation.

10. The method of claim 9, wherein:
when said span switch operation is performed, said in-band signal is transmitted via said third optical channel using said multiplexer; or
when said ring switch operation is performed, said in-band signal is transmitted via said third optical channel using a different multiplexer.

11. An optical switch comprising a processor in a memory, said optical switch adapted to perform the steps of:
(a) collecting a plurality of bit error rate (BER) values;
(b) storing said BER values;
(c) analyzing said BER values using a BER hysteresis algorithm to check for an indication of BER degradation, wherein said analyzing comprises:
comparing each of a plurality of recent ones of said collected BER values to a predetermined BER threshold level, wherein said recent ones of said collected BER values include a subset of said collected BER values;
determining, for each of said recent ones of said collected BER values, whether said recent BER value exceeds said predetermined BER threshold level;
in response to a determination that each of said recent ones of said collected BER values exceeds the predetermined BER threshold level, determining whether said collected BER values worsen over time;
in response to a determination that said collected BER values worsen over time, detecting an indication of BER degradation; and
(d) switching a transmission port in response to said indication of BER degradation.

12. The apparatus of claim 11, wherein said step (c) comprises:
(c1) setting a flag to zero;
(c2) acquiring a recent BER value;
(c3) determining whether said recent BER value exceeds said predetermined BER threshold level;
(c4) incrementing said flag, storing said recent BER value in an array, and comparing said flag with said BER degradation threshold upon a positive determination in step (c3);
(c5) setting said flag to zero and storing said BER value in said array upon a negative determination is step (c3);
(c6) repeating steps (c2)-(c5) until said flag is greater than said predetermined maximum flag value;
(c7) determining whether a predetermined number of recently acquired BER values worsen over time; and
(c8) issuing a trigger signal that switching is required upon a positive determination step (c7).

13. The apparatus of claim 12, wherein said step (c) further comprises:
(c9) determining whether said predetermined number of recently acquired BER values fluctuate randomly upon a negative determination in step (c7);
(c10) classifying said recently acquired BER values as a transient disturbance, setting said flag to zero, and proceeding to step (c2) upon a positive determination in step (c9); and
(c11) determining whether said predetermined number of recently acquired BER values is similar upon a negative determination in step (c9).

14. The apparatus of claim 13, wherein said step (c) further comprises:
(c12) classifying said recently acquired BER values as a transient disturbance, setting said flag to zero, and proceeding to step (c2) upon a negative determination in step (c11); and
(c13) issuing a trigger signal that switching is required upon a positive determination in step (c11).

15. The apparatus of claim 14, further adapted to transmit a switching request periodically until the expiration of a predetermined time or until receipt of an acknowledgement signal.

16. The apparatus of claim 15, further adapted to issue a signal to switch to a protection channel in response to said acknowledgement signal.

* * * * *